Figure 2:
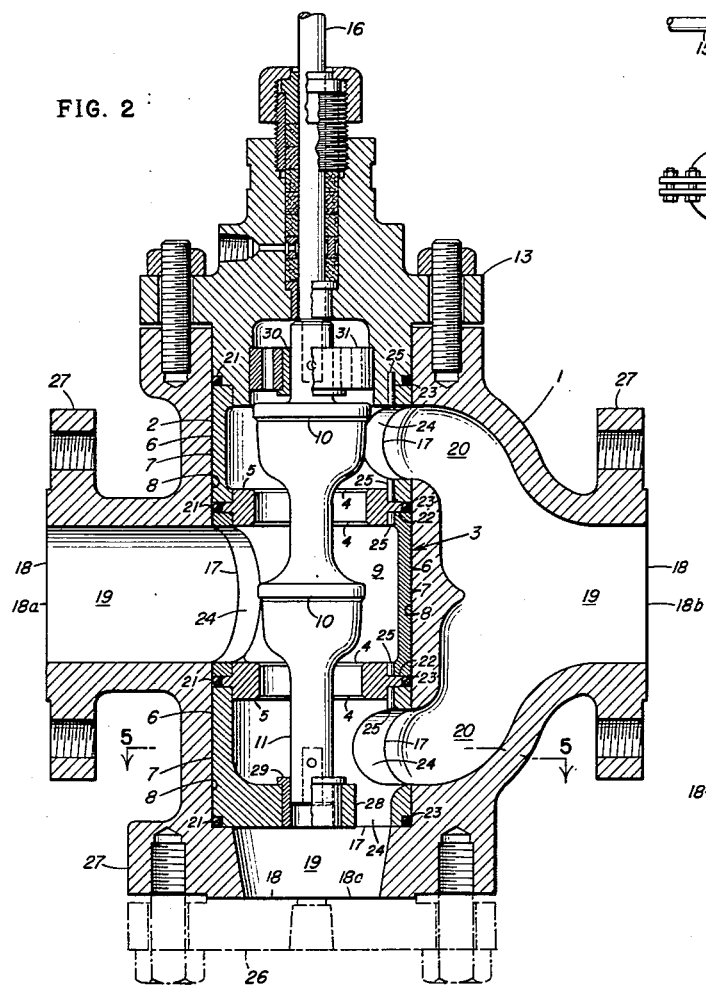

March 3, 1964  C. A. ELSEY  3,123,091
CONVERTIBLE MOTOR VALVE
Filed Aug. 19, 1955  2 Sheets-Sheet 1

Inventor:
Cleo. A. Elsey
By Wilmer Mechlin
his Attorney

March 3, 1964  C. A. ELSEY  3,123,091
CONVERTIBLE MOTOR VALVE
Filed Aug. 19, 1955  2 Sheets-Sheet 2

Inventor:
Cleo. A. Elsey
By Wilmer Mechlin
his Attorney

United States Patent Office 3,123,091
Patented Mar. 3, 1964

3,123,091
CONVERTIBLE MOTOR VALVE
Cleo A. Elsey, P.O. Box 427, A4, R.R. 1, Bartlesville, Okla.
Filed Aug. 19, 1955, Ser. No. 529,543
11 Claims. (Cl. 137—270)

This invention relates to automatic control valves in which a controlled force is applied through force-responsive means to actuate a valve stem carrying one or more valve elements and therethrough regulate the flow of fluid through one or a plurality of lines, such valves herein being termed generally "motor valves" and in their most usual form having their stems actuated by pressure responsive diaphragms and being known as "diaphragm motor valves."

Normally, motor valves are adapted to control the flow of fluid through but a single line and while both straight-way and angle forms of such valves have been proposed, each has had a body designed for the particular task and incapable of performing another. Not only have the valve bodies been special, but their inner valve mechanisms, as well, have been single purpose, except that it is not uncommon to employ invertible valve stems for converting a motor valve from a normally open to a normally closed valve or vice versa, depending on its application. Coupled with their relative complexity, the little leeway in their adaptability, while not mitigating against the widespread use of motor valves, has rendered their installation costly.

The primary object of the present invention is to provide an improved convertible motor valve having an inner valve mechanism of such construction and arrangement as to enable the same valve body to serve as a single port, double port, or multi-way valve.

Another object of the invention is to provide an improved convertible motor valve wherein one or more valve seats are contained in a bore of substantially uniform cross-section and positioned therein by a sleeve or sleeves separate from the seats and slidably seatable in the bore.

An additional object of the invention is to provide a convertible motor valve having a casing wherein a plurality of exterior ports are connectable through a central bore of substantially uniform cross-section, the bore being interrupted by a multiplicity of spaced openings, each connected to one of the ports and seating a plurality of valve seat-carrying disc and disc-positioning sleeve members with each of the sleeve members overlapping one of the openings, whereby by selective assembly of the disc and sleeve members with a stem-carrying one or more valve elements, the same casing may be employed for a balanced or unbalanced valve.

Another object of the invention is to provide a convertible motor valve wherein one or more discs are positionable in a valve chamber by a plurality of sleeves arranged in tandem in a bore of uniform cross section in the valve casing, the sleeves and the discs being selectively assembleable for converting the valve at will into a single port, double port or multi-way valve through which flow of fluid is regulated by one or more valve elements.

An additional object of the invention is to provide an improved convertible motor valve wherein the valve casing has at least three exterior ports opening internally at spaced points onto a central bore of substantially uniform cross-section and one or more valve seats within the bore are positioned by a plurality of sleeves, each overlapping one of the interior openings, whereby by selective assembly of the sleeves, one or more of the openings may be blocked and the same valve body employed for three- or fewer-way applications.

A further object of the invention is to proved an improved convertible motor valve having a valve body with a multiplicity of exterior ports opening internally onto a bore of substantially uniform cross-section in which one or more valve seat-carrying discs are positionable by a plurality of sleeves, whereby by selective assembly of the discs and sleeves with a stem-carrying one or a plurality of valve elements and use of caps for one or another of the ports, the same valve body may be adapted to a wide range of motor valve applications.

Figure 1:
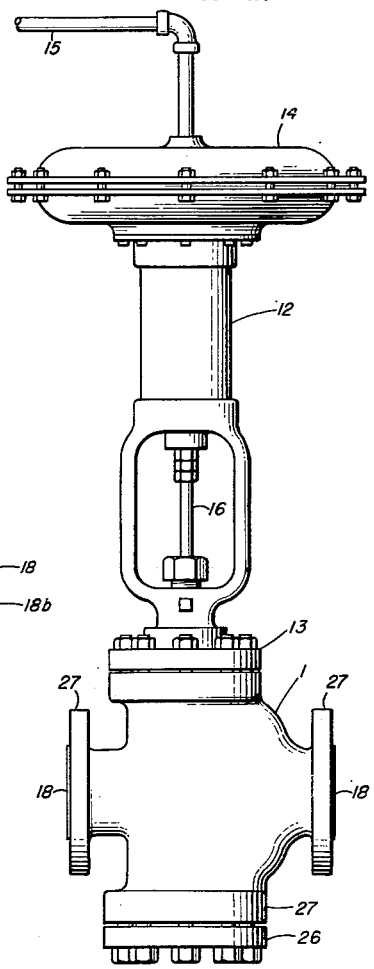
Figure 5:
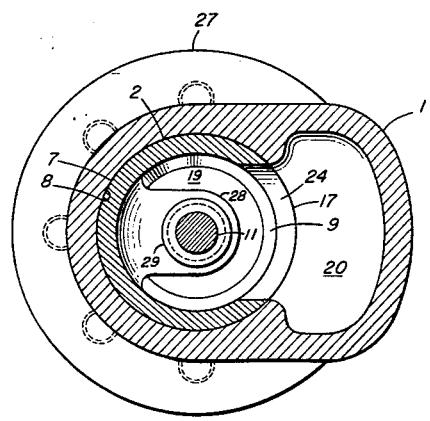
Figure 4:
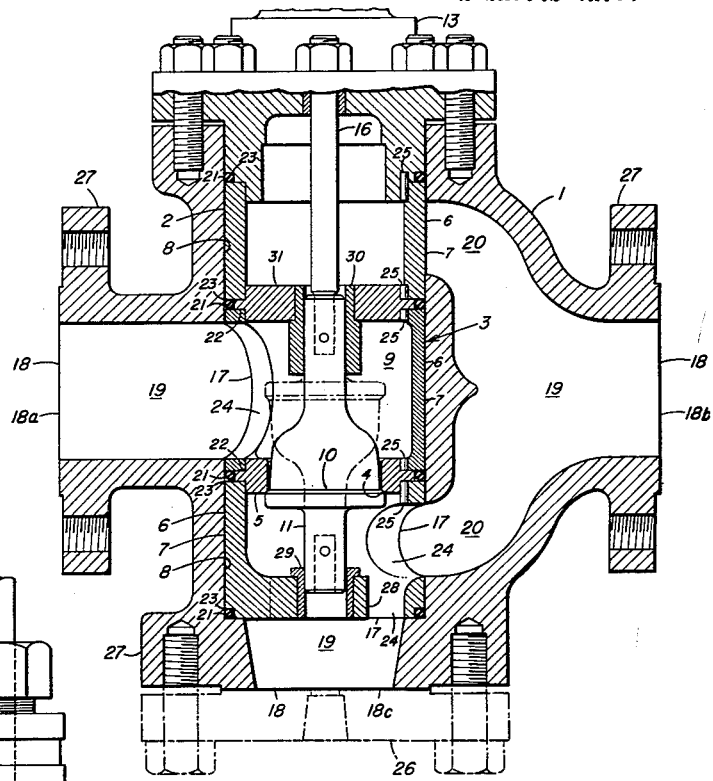
Figure 3:
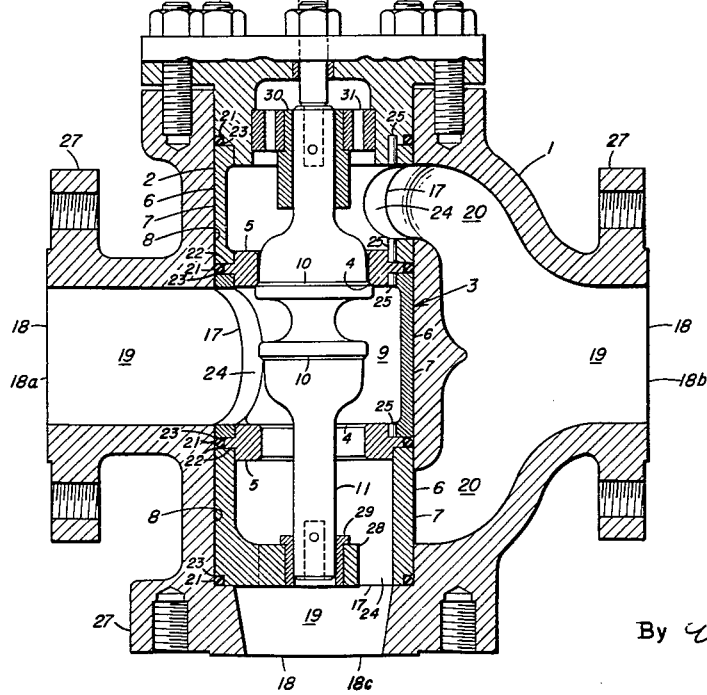

Other objects and advantages of the invention will appear hereinafter in detailed description, be particularly pointed out in the appended claims and be illustrated in the accompanying drawings, in which:

FIGURE 1 is a side elevational view of preferred embodiment of the convertible motor valve of the present invention, FIGURE 2 is a fragmentary central vertical sectional view on an enlarged scale of the motor valve of FIGURE 1, showing two applications illustrating some of the permissible variations in the application of the valve, FIGURE 3 is a fragmentary view taken on the same section and on the same scale as FIGURE 2 illustrating other variations of the valve, FIGURE 4 is a fragmentary view taken on the same section as FIGURES 2 and 3, illustrating further variations, and FIGURE 5 is a horizontal sectional view taken along the lines 5—5 of FIGURE 2.

Referring now in detail to the drawings in which like reference characters designate like parts, the improved convertible motor valve of the present invention is comprised of a valve body or casing 1 having a central bore 2 of substantially uniform cross-section extending to at least one end of the casing and adapted to receive through that end and contain inner valve mechanism 3 for regulating flow of fluid through the casing. The inner valve mechanism is comprised of a valve seat or seats 4 each of which is disposed transversely or cross-wise of the bore and preferably is formed in and carried by an insert or disc 5, the valve seat or seats being positioned longitudinally or axially of the bore 2 by one or more sleeves 6, each having a sliding fit with the bore 2 through an outer or side wall 7 corresponding in cross-section to the inner or side wall 8 of the bore. Contained within the bore 2 in a valve chamber 9 defined by the sleeves 6 and reciprocable or slidable longitudinally or axially relative thereto are one or more valves or valve elements 10, depending in number on that of the valve seats 4, each of which is seatable in and movable or shiftable axially relative to one of the valve seats for regulating flow of fluid therethrough, the valve or valves 10 being carried by and preferably formed integrally with a valve stem 11.

When, as in the illustrated embodiment, the motor valve of the present invention is to form part of a diaphragm motor valve, flow of fluid through the casing 1 is regulated in the conventional manner by the application of controlled pressure to the usual spring-pressed diaphragm (not shown) in a superstructure 12 surmounting the casing and carried by a bonnet 13 bolted or otherwise connected to the casing, the bonnet closing the upper end of the bore 2. Fluid for applying controlled pressure to the diaphragm may be admitted to the dome 14 of the superstructure within which the diaphragm is housed through tubing 15 and the movement of the diaphragm is transmitted to the valve stem 11 for shifting or reciprocating the latter axially and determining the position of each valve 10 relative to its seat 4 by an actuating stem 16 connected at one end to the diaphragm and at the other to the valve stem. It will be noted that either end of the valve stem 11 is connectable to the lower end of the actuating stem 16 and that the opposite end portions of the valve stem, beyond the valve or valves 10, are of different length. This is to permit inversion or reversal of the valve stem, as exemplified in dot-and-dash line in FIGURE 4, so that at least one of the valves 10 in the normal or at rest position of the diaphragm will either be seated or removed from its seat, thus enabling this valve normally to be open or closed, depending on the particular application.

The central bore 2, whether formed in the casing or in a surrounding plug, as in my co-pending application, Serial No. 446,993, filed August 2, 1954, now Patent No. 2,880,748, serves by its uniform cross-section to seat the several components of the inner valve mechanism 3, upon the selective assembly of which the versatility of the valve of the present invention is primarily dependent. In the relatively simple form of motor valve here employed to illustrate the invention, the bore 2 is interrupted by a plurality of openings or interior ports 17, each of which is connected to one of a plurality of exterior ports 18 by a passage 19, the several passages either being separate or certain of them having branches 20 for connecting a plurality of the openings 17 to a single exterior port, depending on the range of operation desired of the motor valve. Since flow of fluid through the valve is regulated by shifting or displacing the one or more valve elements 10 axially of the bore, the several openings 17 not only are spaced, but those between which the flow is to be regulated must be spaced axially of the bore sufficiently to permit the interposition of one of the valve seats 4 therebetween. In common with conventional motor valves, most or all of the openings will open radially the bore and interrupt its side wall 8.

Each of the radially opening of the openings 17 and its longitudinal or axial spacing from the adjoining radial opening determines the longitudinal or axial dimension of the sleeve 6 intended for association therewith, each of the sleeves being designed to overlap or include within its longitudinal limits one of the radial openings. The purpose of this overlapping relation between each sleeve and the associated radial opening is to enable the opening to be either open or blocked, depending on whether the sleeve selected for association with it has its side wall 7 solid or apertured. Not only does the selected sleeve enable the associated opening to be open or blocked at will, but the sleeving, whether comprised of one or a plurality of sleeves, serves to position within the bore the one or more valve seats 4. Extending from end to end of the bore 2 and locked against axial displacement between the lower end of the bore and the bonnet 13, the sleeving in turn determines the initial position of each valve seat axially of the bore as the inner valve mechanism is assembled and thereafter locks or holds the valve seat in that position.

In the illustrated embodiments, each valve seat 4, in line with the usual practice in motor valves, is formed as part of a disc to facilitate its repair or replacement. However, by contrast with conventional discs, the discs 5 are not threaded for interlock with a correspondingly threaded socket, instead being slid or slipped between adjoining of the sleeves 6 and held against axial displacement by abutment with the contiguous or adjoining ends of the sleeves. It is contemplated to employ O-rings or like resilient packing 21 to seal off the interior of the sleeving or valve chamber 9 from the side wall 8 of the bore. To facilitate application of the O-rings to a joint between a pair of sleeves and the interposed or spacing disc, each of the latter has its outstanding peripheral lip or flange 22, through which it is gripped between the sleeves, inset from the side wall of the bore to provide a peripheral groove 23 at the joint for the reception of the O-ring. It has been mentioned that any of the sleeves 6 may have its side wall 7 apertured for access to the associated of the openings 17 from the interior of the bore. To ensure that such an aperture or opening 24 in a sleeve will align or register with the associated opening in the casing and be held against rotation in service, it is contemplated to employ aligning means which may be the cross-sectional configuration of the confronting walls 7 and 8 of the sleeves and bore or, if these walls are cylindrical, conveniently may be in the form of pins 25, one connecting each pair of adjoining sleeves and also connecting the uppermost of the sleeves to the bonnet 13 so that the position of the latter determines the rotative position of each of the sleeves.

The adaptation of the motor valve of the present invention to a particular application is a simple matter. Once the components of the inner valve mechanism 3 required for that application have been selected, they are inserted or slid into one, here the upper, end of the bore 2, the bonnet 13 then being off. Thereafter, the bonnet is bolted or otherwise secured to the casing 1 to lock the sleeves and discs against axial displacement and, through aligning means, rotative displacement, as well. Conversion of an assembled motor valve to a different application is equally simple, entailing only the removal of the bonnet and substitution for one or more of the components of the inner valve mechanism, that or those required for the new application.

The versatility of the motor valve of the present invention is best understood by a comparison of the illustrated three embodiments showing a number of the variations possible with a single valve casing. The casing of the several embodiments has three exterior ports 18, each of which may be either connected to a line or capped, as by a cap or cover 26, the connection being made through suitable means, such as a flange 27 formed about each port integrally with the casing. Two of these ports, designated from left to right as 18a and 18b, respectively, are aligned cross-wise of the casing and the third, 18c, is disposed angularly relative to the other two, here being at right angles and the passage 19 connecting it to the bore 2 forming a restricted coaxial extension of the lower end of the bore. The passage to one of the aligned ports has the aforementioned branches 20, the openings 17 of which into the bore, axially, are disposed at opposite sides of or straddle the opening of the aligned port.

Aside from their casings, the several embodiments possess as a common characteristic of their inner valve mechanisms 3, three of the sleeves 6 and two of the spacing discs 5 and their valves 10 are in the form of globe valves. As shown, the sleeves are arranged in tandem in the bore 2 and the seats are spaced axially of the valve chamber 9 by the opening from the port 18a, each being interposed between that opening and one of the openings from the branches 20.

Another illustrated common characteristic of the several embodiments is the guide means for the lower end of the valve stem 11. Although a spider could be interposed in the passage 19 leading to the bottom port 18c, the lowermost of the sleeves 6 may readily be adapted as a bottom guide by providing it with an integral finger or flange 28 instanding laterally from its side wall 7, and apertured to receive a guide bushing 29. In the two embodiments in which the valve stem carries a plurality of valves, the upper end of the valve stem 11 is guided by a second guide bushing 30 mounted in an annular plate 31 secured to the bonnet 13.

With this basic structure, the selection of the components of the inner valve mechanism enables the same valve casing to be employed in motor valves performing a variety of functions. Thus, in the motor valve of FIGURE 2, by the selection as the valve stem 11 of a stem carrying a pair of globe valves 10 facing in the same direction, as the discs 5 of a pair of discs, both of which carry valve seats 4 and as the sleeve 6, three sleeves, all of which have apertures 24 aligning with the associated openings 17 in the casing, there is obtained a balanced valve which is normally open or closed depending on which end of the valve stem is connected to the actuating stem 16. The functioning of the motor valve may further be changed by capping one or the other of the ports 18b and 18c, capping of the latter making it a double-ported straight-way valve and of the former, a double-ported angle valve, the fluid in either case passing through both of the valve seats to the open port so that the balanced action of the valves is retained.

In the embodiment of FIGURE 3 the motor valve is converted into a valve capable of regulating the division of flow from or between the ports 18b and 18c. This is accomplished by substituting for the lowermost of the sleeves 6 of the valve of FIGURE 2 a sleeve of the same dimensions but having its side wall 7 solid and by substituting for the valve stem of that valve, one carrying a pair of opposed valves, either of which is adapted to seat when the other is open, the lowest sleeve now sealing off the lower of the branches 20 from the valve chamber 9 so that fluid passing through the upper valve seat must flow from or to the port 18b and through the lower valve seat must flow from or to the port 18c. In this form, then, the motor valve is a three-way valve with its upper or its lower valve seat 4 normally closed, depending on the end of the valve stem 11 connected to the actuating stem 16. This form of motor valve also may be converted into a straight-way valve by capping its port 18c or an angle valve by capping its port 18b.

FIGURE 4 illustrates the adaptation of the valve casing 1 for use as part of a motor valve having but a single valve seat. Here, the lowermost of the sleeves has an apertured side, as did that of FIGURE 2, so that the lower of the branches 20 is open to the valve chamber 9, but the uppermost sleeve is solid walled so that to seal off the upper branch from the valve chamber, additionally, only the lower of the two discs 5 carries a valve seat and the valve stem 11 has but a single valve. In this case, it will be noted that the actuating stem 16 is elongated so as to enable the second guide bushing 30, which guides the upper end of the valve stem, to be carried by the upper of the two discs 5. Without more, and whether normally open or closed, the valve in this form is capable of regulating flow from or to the common port 18a and of dividing that flow without regulation between the ports 18b and 18c. A further modification is possible by capping one or the other of the ports 18b and 18c, thus enabling the valve to act as either a straight-way or an angle valve and to regulate flow in either case.

From the above detailed description, it will be apparent that there has been provided a motor valve which by the selective assembly of the components of its inner valve mechanism may be adapted to various applications of motor valves without change in the valve casing, the valve, if multiple ported, being further modifiable by capping one or another of its ports.

It should be understood that the described and disclosed embodiment is merely exemplary of the invention and that all modifications are intended to be included which do not depart from either the spirit of the invention or the scope of the appended claims.

Having described my invention, I claim:

1. A motor valve comprising a casing having a bore of substantially uniform cross-section and a plurality of exterior ports, a multiplicity of spaced openings interrupting said bore and each connected to one of said ports, and inner valve mechanism insertible in said bore through an end thereof, said inner valve mechanism including a plurality of selectively assemblable sleeves each adapted to axially overlap certain of said openings, certain of said sleeves having apertures registerable with openings overlapped thereby and other of said sleeves having solid walls registerable with said overlapped openings and being selectively interchangeable with said certain sleeves for sealing off any of said openings, valve seat means separate from said sleeves and disposed transversely of said bore, said valve seat means being positioned in said bore by said sleeves, and valve means shiftable axially of said bore relative to said seat means for regulating flow of fluid therethrough, said casing by selective assembly of said sleeves being adapted to any of a plurality of applications for motor valves.

2. A motor valve comprising a casing having a bore of substantially uniform cross-section and a plurality of exterior ports, a multiplicity of spaced openings interrupting said bore and each connected to one of said ports, and inner valve mechanism insertible in said bore through an end thereof, said inner valve mechanism including a plurality of selectively assemblable sleeves each adapted to certain of said openings, certain of said sleeves having apertures registerable with openings overlapped thereby and other of said sleeves having solid walls registerable with said overlapped openings and being selectively interchangeable with said certain sleeves for sealing off any of said openings, valve seat means separate from said sleeves and disposed transversely of said bore, said valve seat means being positioned in said bore by the selectively assembled of said sleeves, and valve means shiftable axially of said bore for regulating flow through said seat means, said casing by selective assembly of said sleeves being adapted to any of a plurality of applications for motor valves.

3. A motor valve comprising a casing having a bore of substantially uniform cross-section and a multiplicity of exterior ports, a multiplicity of spaced openings interrupting said bore and each connected to one of said ports, cap means for capping any of said ports, and inner valve mechanism insertible in said bore through an end thereof, said inner valve mechanism including a plurality of selectively assemblable sleeves each adapted to axially overlap certain of said openings, certain of said sleeves having apertures registerable with openings overlapped thereby and other of said sleeves having solid walls registerable with said overlapped openings and being selectively interchangeable with said certain sleeves for sealing off any of said openings, valve seat means separate from said sleeves and disposed transversely of said bore, said valve seat means being positioned in said bore by the selectively assembled of said sleeves, and valve means shiftable axially of said bore for regulating flow through said seat means, said casing by selective capping of said ports and assembly of said sleeves being adapted to any of a plurality of applications for motor valves.

4. A motor valve comprising a casing having a bore of substantially uniform cross-section and a plurality of exterior ports, a multiplicity of spaced openings interrupting said bore and each connected to one of said ports, inner valve mechanism insertible in said bore through an end thereof, said inner valve mechanism including a plurality of sleeves selectively assemblable in tandem and each adapted to overlap axially of said bore one of said openings, certain of said sleeves each having an aperture registerable with the opening adapted to be overlapped thereby and being interchangeable with another of said sleeves having a solid wall registerable with said opening for sealing off said opening, valve seat means disposed transversely of said bore and positioned by the selectively assembled sleeves between certain of said openings, certain of said valve seat means being interposed between and spacing adjoining of said sleeves, and valve means shiftable axially of said bore for regulating flow through said valve seat means, said casing by selective assembly of said sleeves being adapted to any of a plurality of applications for motor valves.

5. A motor valve comprising a casing having a bore of substantially uniform cross-section and a multiplicity of exterior ports, a multiplicity of spaced openings interrupting said bore and each connected to one of said ports, cap means for capping any of said ports, inner valve mechanism insertible in said bore through an end thereof, said inner valve mechanism including a plurality of sleeves selectively assemblable in tandem and each adapted to overlap axially of said bore one of said openings, certain of said sleeves each having an aperture registerable with the opening adapted to be overlapped thereby and being interchangeable with another of said sleeves having a solid wall registerable with said opening for sealing off said opening, valve seat means disposed transversely of said bore and positioned by the selectively assembled sleeves between certain of said openings, certain of said valve seat means being interposed between and spacing adjoining of said sleeves, and valve means shiftable axially of said bore for regulating flow through said valve seat means, said casing by selective capping of said ports and assembly of said sleeves being adapted to any of a plurality of applications for motor valves.

6. A motor valve comprising a casing having a bore of substantially uniform cross-section and a plurality of exterior ports, a multiplicity of spaced openings interrupting said bore and each connected to one of said ports, and inner valve mechanism insertible in said bore through an end thereof, said inner valve mechanism including a plurality of sleeves corresponding in external cross-section to and arranged in tandem in said bore, each of said sleeves axially of said bore overlapping at least one of said openings, valve seat means separate from said sleeves, said valve seat means being disposed transversely of said bore and positioned therein by said sleeves between certain of said openings, valve means shiftable axially of said bore relative to said seat means for regulating flow therethrough, each of said sleeves having an aperture normally registering with the overlapped of said openings, and a plurality of solid-walled sleeves each interchangeable with one of said first-named sleeves for adapting said casing to any of a plurality of applications for motor valves.

7. A motor valve comprising a casing having a bore of substantially uniform cross-section and a plurality of exterior ports, a multiplicity of spaced openings interrupting said bore and each connected to one of said ports, and inner valve mechanism insertible in said bore through an end thereof, said inner valve mechanism including a plurality of sleeve members arranged in tandem and each axially overlapping and having an aperture normally registering with one of said openings, a plurality of separate disc members disposed transversely of said bore and being spaced axially thereof and each positioned between certain of said openings by said sleeve members, certain of said disc members carrying a valve seat, a valve stem member reciprocable axially of said bore and carrying a valve for each seat, and a plurality of members each changeable with and of different characteristics than one of said sleeve, disc and valve stem members for adapting said motor valve to any of a plurality of motor valve applications.

8. A motor valve comprising a casing having a bore of substantially uniform cross-section and a plurality of exterior ports, a multiplicity of spaced openings interrupting said bore and each connected to one of said ports, and inner valve mechanism insertible in said bore through an end thereof, said inner valve mechanism including a plurality of sleeve members arranged in tandem and each axially overlapping and having an aperture normally registering with one of said openings, a plurality of disc members disposed transversely of said bore and positioned therein between certain of said openings by endwise gripping of said disc members by adjoining of said sleeve members, certain of said disc members carrying a valve seat, a valve stem member shiftable axially of said bore and carrying a valve for each seat, and a plurality of members each interchangeable with and of different characteristics than any of said sleeve, disc and valve stem members for adapting said motor valve to any of a plurality of motor valve applications.

9. A motor valve comprising a casing having a bore of substantially uniform cross-section and a plurality of exterior ports, a multiplicity of spaced openings interrupting said bore and each connected to one of said ports, and inner valve mechanism insertible in said bore through an end thereof, said inner valve mechanism including a plurality of sleeve members arranged in tandem and each axially overlapping and having an aperture normally registering with one of said openings, a plurality of disc members disposed transversely of said bore and each spacing and positioned in said bore by a pair of adjoining sleeves, certain of said disc members carrying a valve seat, O-rings sealing the interior of said sleeves from said bore, a valve stem member reciprocable axially of said bore and carrying a valve for each valve seat, and a plurality of members each interchangeable with and of different characteristics than one of said sleeve, disc and valve stem members for adapting said motor valve to any of a plurality of applications.

10. A motor valve comprising a casing having a multiplicity of exterior ports, a pair of said ports being aligned and another of said ports being disposed at an angle to said pair, a bore of substantially uniform cross-section in said casing, a multiplicity of openings interrupting said bore and each connected to one of said ports, a pair of said openings being connected to the same of said aligned ports by a branched passage, said pair of openings straddling the opening from the other of said pair of aligned ports, and inner valve mechanism insertible in said bore through an end thereof, said inner valve mechanism including a multiplicity of sleeves arranged in tandem and each overlapping axially of said bore one of said openings from said aligned pair of ports, said sleeves overlapping said pair of openings each having an aperture normally registering with its opening, a plurality of sleeve members each interchangeable with one of said sleeves and adapted to block its opening, a pair of discs each carrying a valve seat, said discs being disposed transversely of said bore and each spacing and positioned by adjoining of said sleeves between said straddled opening and one of said pair of openings, a pair of guiding discs each interchangeable with one of said first-named discs, and a valve stem reciprocable axially of said bore and carrying a valve for each of said valve seats, said valve stem being guidable at one end by a guiding disc, and said motor valve through the selective assembly of said components of said inner valve mechanism being adapted for any of a multiplicity of motor valve applications.

11. A motor valve comprising a casing having a multiplicity of exterior ports, a pair of said ports being aligned and another of said ports being disposed at an angle to said pair, a bore of substantially uniform cross-section in said casing, a multiplicity of openings interrupting said bore and each connected to one of said ports, a pair of said openings being connected to the same of said aligned ports by a branched passage, said pair of openings straddling the opening from the other of said pair of aligned ports, means for selectively capping any of said ports, and inner valve mechanism insertible in said bore through an end thereof, said inner valve mechanism including a multiplicity of sleeves arranged in tandem and each overlapping axially of said bore one of said openings from said aligned pair of ports, said sleeves overlapping said pair of openings each having an aperture normally registering with its opening a multiplicity of sleeve members each interchangeable with one of said sleeves and adapted to block its opening, a pair of discs disposed transversely of said bore and each spacing and positioned by adjoining of said sleeves between said straddled opening and one of said pair of openings, both of said discs normally carrying valve seats, a pair of guiding discs each interchangeable with one of said first-named discs, and a valve stem reciprocable axially of said bore and carrying a valve for each of said valve seats, said valve stem being guidable at one end by a guiding disc, and said motor valve through selective capping of said ports and assembly of said components of said inner valve mechanism being adapted for any of a multiplicity of motor valve applications.

References Cited in the file of this patent

UNITED STATES PATENTS

| | | | |
|---|---|---|---|
| 30,485 | Letellier | Oct. 23, | 1860 |
| 138,077 | Cushing | Apr. 22, | 1873 |
| 177,745 | Plass | May 23, | 1876 |
| 922,017 | Milke | May 18, | 1909 |
| 1,204,901 | Plaut | Nov. 14, | 1916 |
| 1,517,990 | Hinkle | Dec. 2, | 1924 |
| 1,635,287 | Parker | July 12, | 1927 |
| 1,909,755 | Cederstrom | May 16, | 1933 |
| 1,928,433 | Nuebling | Sept. 26, | 1933 |
| 1,988,545 | Donn | Jan. 22, | 1935 |
| 1,991,032 | Spence | Feb. 12, | 1935 |
| 2,433,414 | Annin | Dec. 30, | 1947 |
| 2,506,129 | Ashton | May 2, | 1950 |
| 2,634,110 | Rupp | Apr. 7, | 1953 |
| 2,661,182 | Kipp | Dec. 1, | 1953 |
| 2,699,756 | Miller | Jan. 18, | 1955 |
| 2,712,830 | Hugg | July 12, | 1955 |

FOREIGN PATENTS

| | | |
|---|---|---|
| 14,159 | Great Britain | of 1911 |